United States Patent [19]
Kitagawa

[11] Patent Number: 5,868,457
[45] Date of Patent: Feb. 9, 1999

[54] STRUCTURAL MEMBER OF VEHICLE BODY

[75] Inventor: Yuichi Kitagawa, Zushi, Japan

[73] Assignee: Nissan Motor Co., Ltd., Yokohama, Japan

[21] Appl. No.: 867,649

[22] Filed: Jun. 2, 1997

Related U.S. Application Data

[63] Continuation of Ser. No. 504,072, Jul. 19, 1995, abandoned.

[30] Foreign Application Priority Data

Jul. 19, 1994 [JP] Japan .................................. 6-166634

[51] Int. Cl.$^6$ .................................................. B62D 15/08
[52] U.S. Cl. .................... 296/188; 296/189; 296/203.02; 296/205
[58] Field of Search .................................... 296/188, 189, 296/203.02, 203.04, 204, 194, 195, 205; 280/784, 785, 797.798

[56] References Cited

U.S. PATENT DOCUMENTS

| | | | |
|---|---|---|---|
| 3,856,324 | 12/1974 | Saitoh . | |
| 4,152,012 | 5/1979 | Reidelbach | 280/784 |
| 4,406,343 | 9/1983 | Harasaki | 296/194 X |
| 4,955,663 | 9/1990 | Imura | 296/194 |
| 5,244,248 | 9/1993 | Bovellan | 296/194 |
| 5,338,080 | 8/1994 | Janotik et al. | 296/197 X |
| 5,409,289 | 4/1995 | Kalian et al. | 296/194 X |
| 5,429,388 | 7/1995 | Wheatley et al. | 280/784 |

FOREIGN PATENT DOCUMENTS

| | | |
|---|---|---|
| 2 325 950 | 12/1973 | Germany . |
| 38 26 958 A1 | 3/1989 | Germany . |
| 39 09 388 | 9/1990 | Germany . |
| 4039172 | 2/1992 | Japan .................................. 296/188 |
| 4050083 | 2/1992 | Japan .................................. 296/194 |

*Primary Examiner*—Dennis H. Pedder
*Attorney, Agent, or Firm*—Foley & Lardner

[57] ABSTRACT

A vehicle-body structural member which extends in the fore-and-aft direction of a vehicle and axially receives a compressive force in the event of a collision of the vehicle. An embodiment of structural member is comprised of a front portion of a polygonal cross-section, an intermediate portions and a rear portion of a polygonal cross-section. The intermediate portion is formed to continuously change its cross-section from a cross-section of the front portion to a cross-section of said rear portion. Further, the intermediate portion has a compressive strength which is greater than those of the front and rear portions, the intermediate portion supports a predetermined weight such as an engine. Therefore, the front portion receives an inertia force which is larger than that applied to the rear portion in the event of a front-end collision of the vehicle so that the front portion is compressingly deformed.

22 Claims, 10 Drawing Sheets

— 1 —
STRUCTURAL MEMBER OF VEHICLE BODY

BACKGROUND OF THE INVENTION

This application is a continuation of application Ser. No. 08/504,072, filed Jul. 19, 1995, now abandoned.

The present invention relates to improvements in a structural member of a vehicle body, and more particularly to a structural member extending in the fore-and-aft direction of a vehicle, such as a front side member and a rear side member.

Various designs of front side members have been proposed that are intended to absorb an impact energy in the event of a front-end collision of vehicles while ensuring a sufficient structural rigidity. DE Patent Provisional Publication No. 3909388 discloses a front side member constituted by first and second press-formed panels. The first and second press-formed panels are connected to each other through their flanges by means of welding. The front side member has a front portion formed in an octagonal cross-section and a rear portion formed in a heptagonal cross-section. The rear portion is connected to the front portion and extends backward while increasing its cross-sectional area. A reinforcement member for increasing the compressive strength of the rear portion is attached to the rear portion such that a compressive deformation certainly starts from the front portion in the event of the front-end collision.

However, this bulky structure degrades the utility of an engine compartment, and the attachment of the reinforcement member to the rear portion increases manufacturing cost and vehicle weight.

SUMMARY OF THE INVENTION

It is an object of the present invention to provide an improved structural member which smoothly deforms from a collision force loaded end backward in the event of a vehicle collision and which has improved bending and torsional rigidity.

It is another object of the present invention to provide a simple and compact structural member which improves manufacturing cost and utility of an engine compartment of a vehicle.

According to the present invention, a structural member of a vehicle body, which extends in the fore-and-aft direction of a vehicle and receives a compressive force in the event of a collision of the vehicle, comprises a front portion which is polygonal in cross-section and has an end functioning as a collision end. A rear portion is polygonal in cross-section. The rear portion is arranged such that a compressive strength due to the cross-section of the rear portion is smaller than that due to the cross-section of the front portion. An intermediate portion connects the front and rear portions and has a cross-section which is continuously changed from a cross-section of the front portion to a cross-section of the rear portion. The intermediate portion has a compressive strength which is greater than those of the front and rear portions, and the intermediate portion supports a predetermined weight.

With this arrangement, a bending rigidity and torsional rigidity of the structural member are improved, and it becomes possible to execute a collision energy absorption by sufficiently deforming the structural member from a front end to a rear end in the event of the collision of the vehicle. Furthermore, this structural member does not require the addition of a dedicated reinforcement for the rear portion or an increase in the cross-sectional area of the rear portion. Therefore, production cost and weight of the structural member are improved.

BRIEF DESCRIPTION OF THE DRAWINGS

Like reference numerals designate like parts and elements throughout all figures, in which.

DETAILED DESCRIPTION OF THE INVENTION

Figure 1:
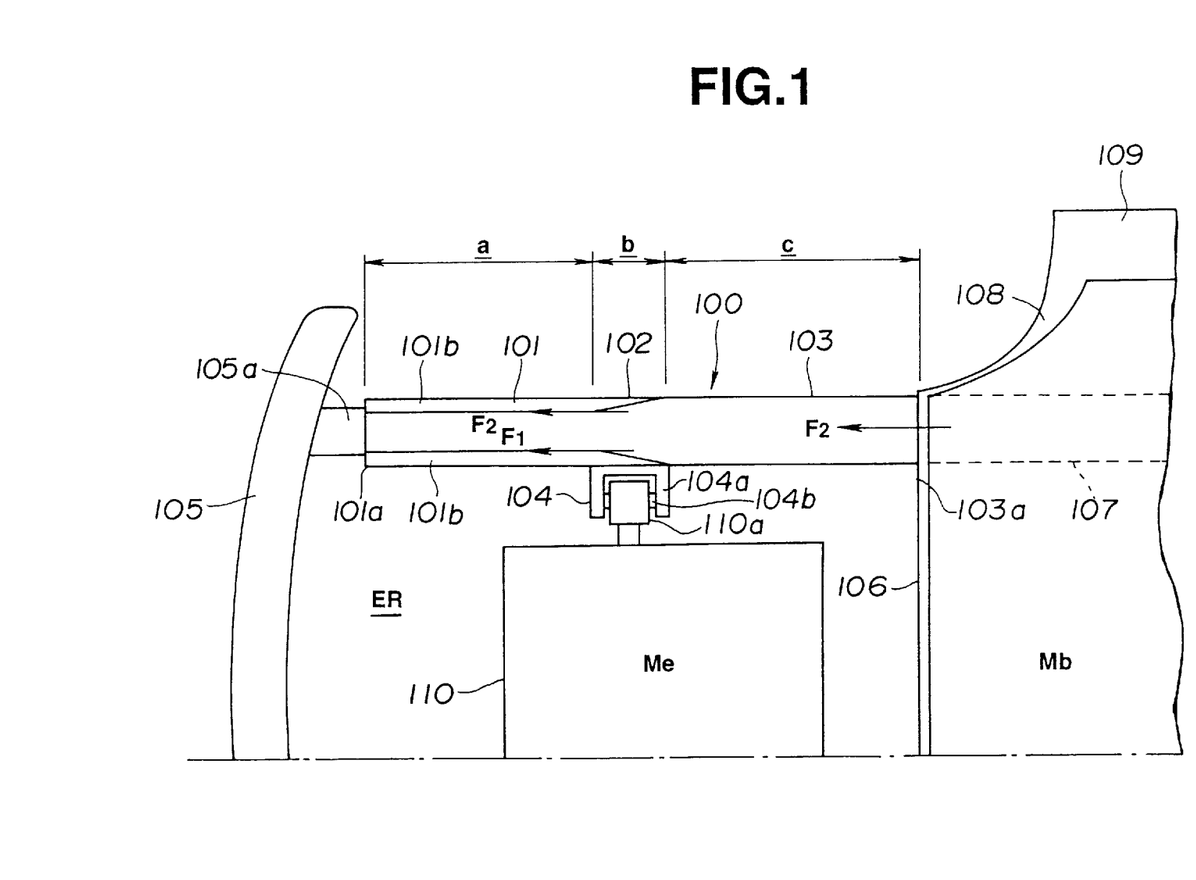
FIG. 1 is a schematic view which shows an installation condition of a front side member of a first embodiment according to the present invention.
Figure 2:
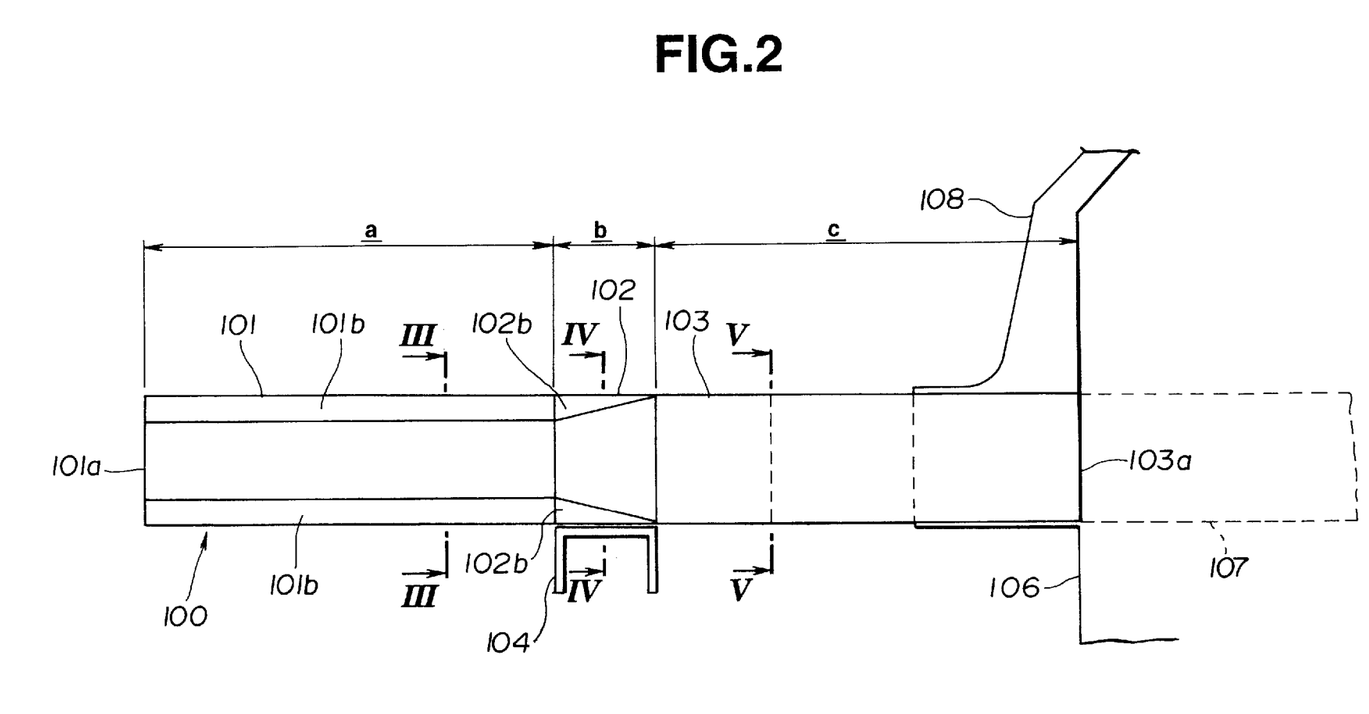
FIG. 2 is an enlarged partial view of FIG. 1 which shows the front side member according to the present invention.

Referring to FIGS. 1 to 6, there is shown a first embodiment of a structural member of a vehicle according to the present invention. In this embodiment, a pair of front side members 100, which are a pair of parts of a vehicle body, are constructed according to the present invention as shown in FIG. 1. The front side member 100 is disposed at each lateral side of an engine compartment ER and extends in the fore-and-aft direction of the vehicle as shown in FIG. 1. As shown in FIG. 2, the front side member 100 comprises a front portion 101 having a length a, an intermediate portion (or cross-section changing portion) 102 having a length b, and a rear portion 103 having a length c. The front portion 101 has a front end 101a which functions as a collision end in the event of a front-end collision of the vehicle. The other end of the front portion 101 is integrally connected with the intermediate portion 102 which is integrally connected with the rear portion 103. The front end 101a of the front portion 101 is connected with a front bumper 105 through one of a pair of bumper stays 105a. A rear end 103a of the rear portion 103 is in butt-joint with a front part of a dash lower panel 106 which partitions a passenger compartment from the engine compartment ER.

The rear end 103a of the rear portion 103 is further connected with an extension member 107 which extends along a lower surface of the dash lower panel 106 and to the rear of the passenger compartment. The front side member 100 is connected to a side sill 109 through a gusset member (or reinforcement plate) 108.

Figure 3:
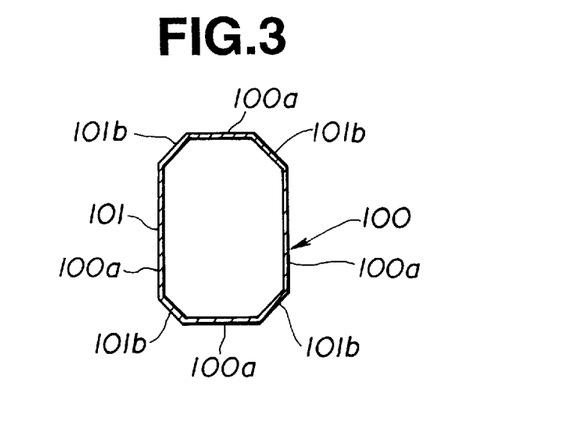
FIG. 3 is a sectional view taken in the direction of arrows substantially along the line III—III of FIG. 2.
Figure 4:
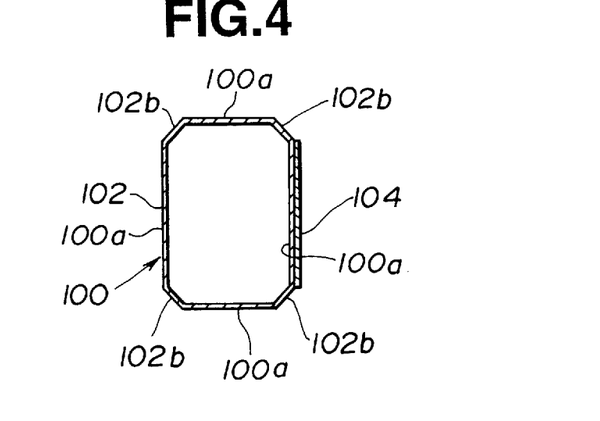
FIG. 4 is a sectional view taken in the direction of arrows substantially along the line IV—IV of FIG. 2.
Figure 5:
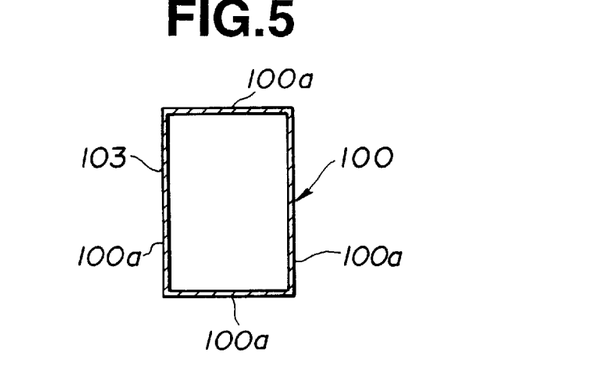
FIG. 5 is a sectional view taken in the direction of arrows substantially along the line V—V of FIG. 2.
Figure 6:
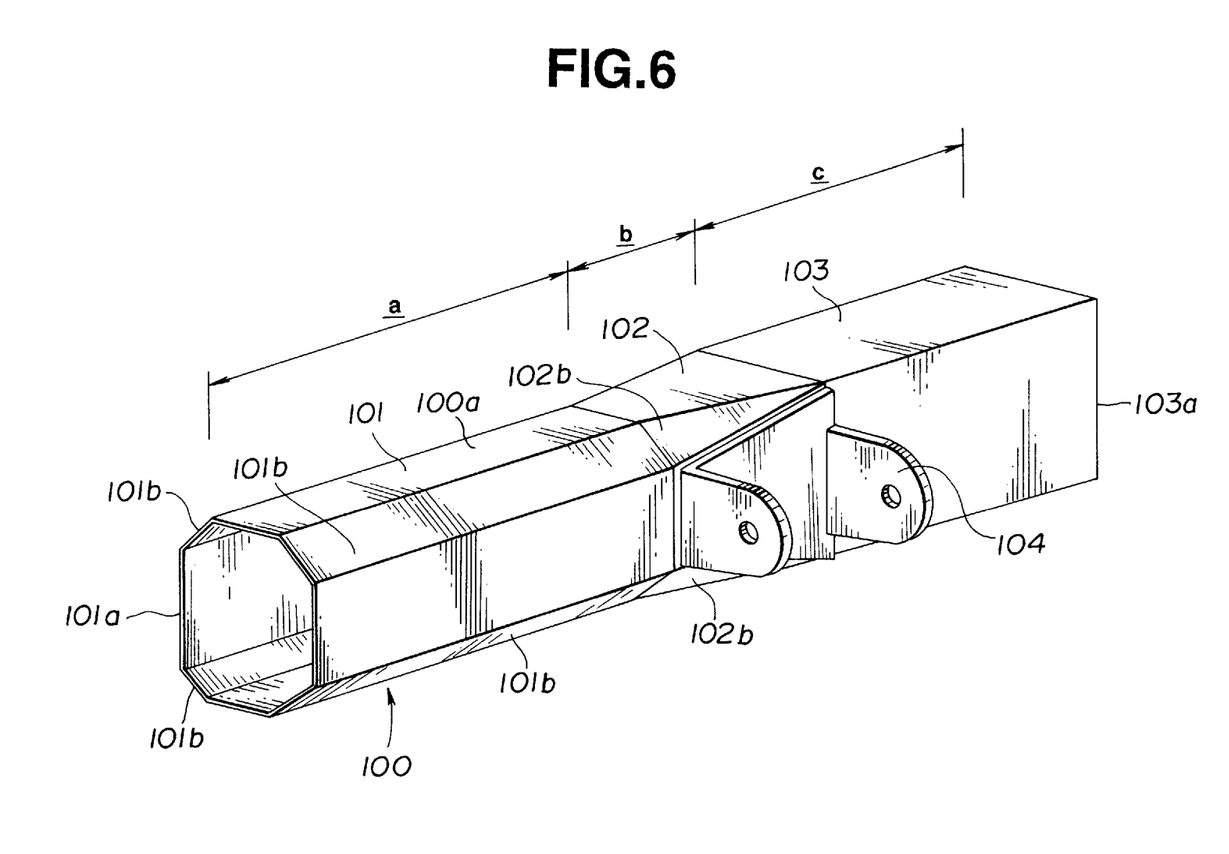
FIG. 6 is a perspective view of the front side member of the first embodiment of FIG. 1.

As shown in FIG. 3, the front portion 101 of the front side member 100 is formed octagonal in cross-section. The octagonal cross-section is constituted by four base walls 100a and four oblique walls 101b formed at four corners of the four base walls 100a. The front portion 101 is straight, so that the front end 101a and a rear end thereof are the same in cross-section. The rear portion 103 is constituted by four base walls 100a and formed rectangular in cross-section as shown in FIG. 5. The rear portion 103 is straight, so that the front end and a rear end 103a thereof are the same in cross-section. The intermediate portion 102 is formed so that its cross-section continuously changes from the octagon of the front portion 101 to the rectangle of the rear portion 103 as positioned backward. That is, four oblique walls 102b of the intermediate portion 102 is gradually reduced and is disappeared at a connecting portion between the intermediate portion 102 and the rear portion 103 as shown in FIG. 6. The intermediate portion 102 is formed to have a compressive strength which is greater than those of the front and rear portions 101 and 103 by using a thicker or harder material as compared with those of the front and rear portions 101 and 103.

It will be understood that the front side member 100 may be made from a rectangular extruded hollow member which has a cross-section as is the same as that of the rear portion 103. The rectangular extruded hollow member is cut to have a length of the front side member 100, and then the front portion 101 and the intermediate portion 102 are press-formed to have respective cross-sections. Of course, the front, intermediate, and rear portions 101, 102, and 103 may be separately formed and then integrally connected by means of seam-welding in a butt joint.

A supporting number, mount bracket 104 such as, is fixedly connected with an inner base 100a of the intermediate member 102 which wall faces the engine compartment ER. A connecting surface of the mount bracket 104 is formed to fit with the inner base wall 100a of the intermediate portion 102 and is integrally connected with the inner base wall 100a so as to further increase the compressive strength of the intermediate portion 102. The mount bracket 104 comprises a channel-shaped member 104a and a supporting bar 104b. The mount bracket 104 is interconnected with an engine 110 through a mount member 110a to support the engine at the intermediate portions 102.

With the thus arranged embodiment, when a collision impact is applied to the front end 101a of the front side member 100 through the front bumper 105 and the bumper stays 105a in the event of a front-end collision of the vehicle, the front side member 100 generates a reaction force against the collision impact and toward the front end 101a. Therefore, the front side member 100 acts to absorb the collision impact (collision energy) by deforming in the axial direction.

More particularly, an inertia force $(F_1+F_2)$ due to a weight Mb of the vehicle body and a weight Me of the engine 110 is applied to the front end 101a of the front side member 100 as a compressive force. An inertia force $F_1$ corresponding to the weight Me of the engine 110 is applied to the intermediate portion 102. An inertia force $F_2$ corresponding to the weight Mb of the vehicle body except for the weight Me is directed to the front end of the front side member 100 and is applied to the rear end 103a of the rear portion 103. That is, the inertia force $F_2$ is applied to the whole of the front side member 100 such as the front, intermediate and rear portions 101, 102 and 103. The inertia force $F_1$ is applied only to the front portion 101.

Since the intermediate portion 102 is formed so that the compressive strength thereof is higher than those of the front and rear portions 101 and 103, the front portion 101 compressingly receives a combined force $F_1+F_2$ and the rear portion 102 compressingly receives the force $F_2$ if it assumes that the inertia force due to the weights of these portions 101, 102, and 103 is negligible. Therefore, even if the front side member 100 is formed so that the compressive strength of the front portion 101 is $(F_1+F_2)/F_2$ times the compressive force of the rear portion 103, the front side member 100 is smoothly compressingly deformed from the front end 101a to the rear side by the compressive force in the event of the front-end collision.

As a typical case, assuming that a half of the weight Me of the engine 110, which is applied to the mount bracket 104, is 200 kg, a half of the weight Mb of the vehicle body except for the engine weight Me which is applied to the rear end 103a of the rear portion 103 is 400 kg, and the decelerating acceleration $\alpha_e$ of the engine 110 and the decelerating acceleration $\alpha_b$ of the vehicle body are both $\alpha(m/s^2)$, it is determined that $F_1=200a$ (N), $F_2=400a$ (N). Therefore, the inertia force $(F_1+F_2)$ applied to the front portion 101 becomes $200\alpha$. (N)+$400\alpha(N)=600\alpha(N)$, and the inertia force $F_2$ applied to the rear portion 103 becomes $400\alpha(N)$. As a result, the ratio between the applied compressive forces to the front and rear portions 101 and 103 becomes 3:2.

According to the common experiments, when an octagonal cross-section hollow member and a rectangular cross-section hollow member had the same cross-sectional area and the same thickness material, the ratio between the compressive strengths of these members became about 3:2. Therefore, one may assume that the ratio between compressive strengths of the front portion 101 and the rear portion 103 generally becomes 3:2.

Accordingly, the applied compressive force and the compressive strength as to the front and rear portions 101 and 103 are generally balanced. Therefore, the front side member 100 is compressingly deformed in turn from the front end 101a backward. Furthermore, by adjusting the length a of the front portion 101 to an effective value of the compressed amount of the engine compartment ER in the event of the front-end collision of the vehicle, it becomes possible to maintain a high reaction force against the compressive force during a compressive deformation of the front portion 101. That is, the collision energy is sufficiently absorbed by the front side members 100.

In a case where the intermediate portion 102 does not support a predetermined weight, such as the weight Me of the engine 110, the front and rear portions 101 and 103 equally receive the inertia force $400\alpha$. (N) while having the compressive strengths at 3:2 ratio, and the front side member 100 is deformed from the rear portion 103.

Although the front portion 101 of the front side member 100 is octagonal in cross-section and the rear portion 103 is rectangular in cross-section so that the compressive strength of the front portion 101 is higher than that of the rear portion 103, the front side member 100 is compressingly deformed in turn from the front end 101a. Accordingly, the front side member 100 has improved bending rigidity (bending deformation) and torsional rigidity (torsional deformation), which enables effective energy absorption during a front-end collision of the vehicle.

Furthermore, since the front side member 100 is formed so as not to generate a compressive deformation or bending from the rear portion 103, which has a compressive strength smaller than the front portion 101, it is not necessary to add a reinforcement member for the rear portion 103 or to enlarge the cross-sectional area of the rear portion 103. Therefore, this structure generates merits in manufacturing cost and weight. Further, by using a rectangular cross-section member, the consistency and connecting ability of the front side member 100 is largely improved.

Figure 7:
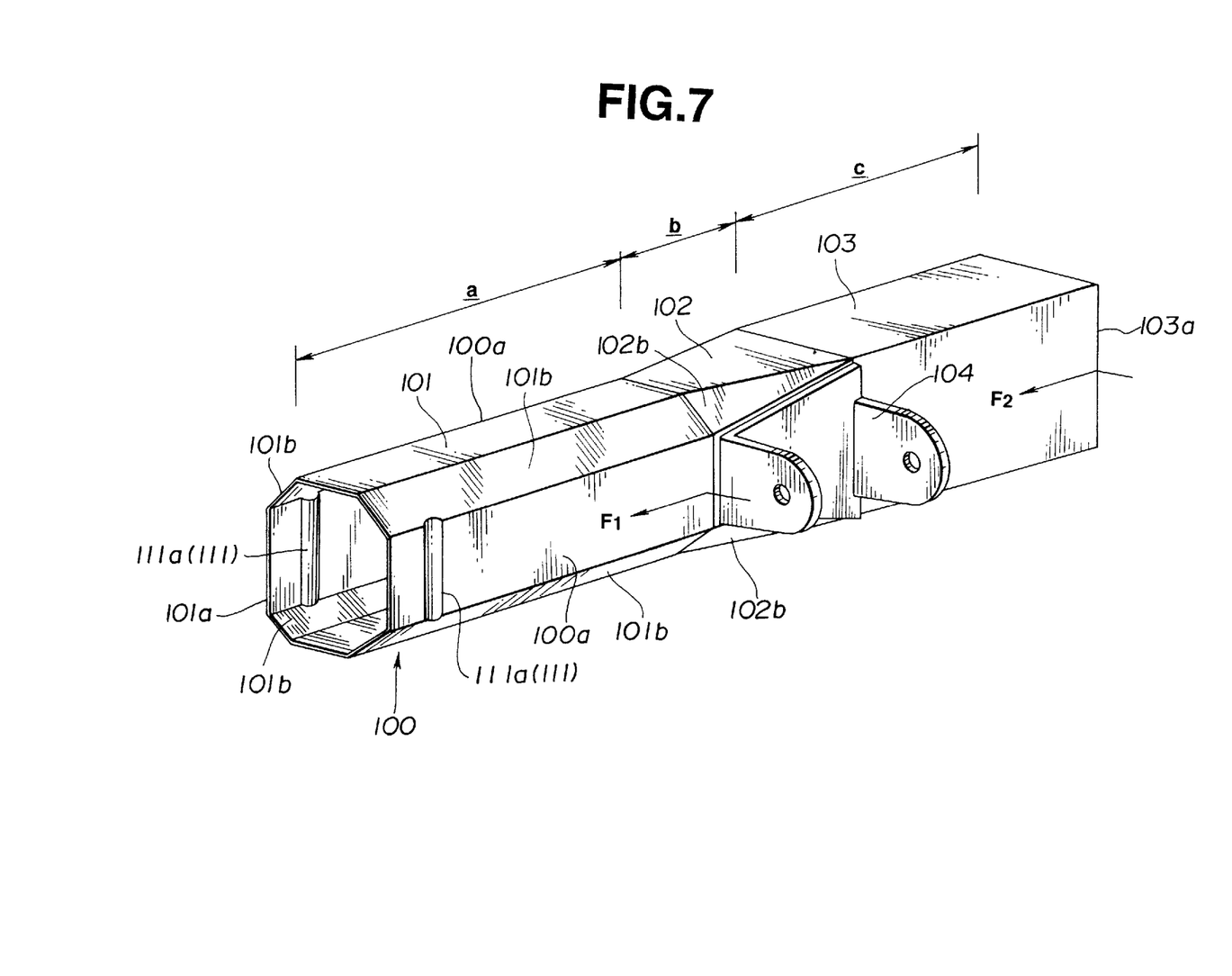
FIG. 7 is a perspective view of a second embodiment of the front side member according to the present invention.

Referring to FIG. 7, there is shown a second embodiment of the structural member of the vehicle body and, more particularly, a front side member according to the present invention.

The second embodiment is generally similar to the first embodiment except that a pair of beads 111a are formed at each side base wall 100a of the front portion 101 of the front side member 100, as shown in FIG. 7. The beads 111a are vertically extended on the both side base walls 100a, respectively, so as to function as an easy compression part 111. The height dimension of this bead 111a is 5 to 10 times the thickness of the construction member of the front portion 101. With this arrangement, the compressive strength of the front portion 101 becomes generally one-half of the no-bead front portion 101 of the first embodiment.

In general, a bending moment almost does not generate in the vicinity of the front end 101a of the front portion 100 when the compressive force is axially applied to the front end 101a. Accordingly, by forming the easy compression parts 111 in the vicinity of the front end 101a, the front side member 100 starts a deformation from the easy compression parts 111 in the event of the front-end collision of the vehicle, and therefore the front portion 101 is smoothly compressingly deformed to absorb the collision energy.

As mentioned in the explanation of the first embodiment, in the event of the front-end collision of the vehicle, the inertia force $F_1+F_2$, which is the sum of the vehicle weight Mb and the engine 30 weight Me, is applied to the front portion 101, and the inertia force F2 of the vehicle weight Mb is applied to the rear portion 103.

Herein, assuming that a half of the weight Me of the engine 110 is 200 kg, a half of the weight Mb of the vehicle body except for the engine weight Me is 600 kg and the decelerating acceleration $\alpha_e$ of the engine 110 and the deceleration acceleration $\alpha_b$ of the vehicle are both $\alpha(m/s^2)$, the applied force is determined to be $F_1=200\alpha(N)$, $F_2=600\alpha(N)$. Therefore, the inertia force applied to the front portion 101 becomes $200\alpha(N)+600\alpha(N)=800a(N)$, and the inertial force applied to the rear portion 103 becomes $600\alpha(N)$. As a result, the ratio between the applied compressive forces to the front and rear portions 101 and 103 becomes $1.3:1\approx800:600=(F_1+F_2):F_2$.

Since the ratio between the compressive strength of an octagonal cross-section hollow member and a rectangular cross-section hollow member with the same cross-sectional area and the same thickness is about 3:2 as mentioned above, it may happen that the front side member 100 is deformed from the rear portion 103 in case that the front and rear portions 101 and 103 are made from the same thickness member in this inertia force balance.

Therefore, by forming the easy compression parts 111 in the vicinity of the front end 101a, the compressive strength of the front portion 101 is reduced into half so that the ratio of the compressive strengths between the front and rear portions 101 and 103 becomes 0.75:1, and the compressive deformation due to the front-end collision starts from the easy compression parts 111. Accordingly, the front side member 100 is certainly deformed from a side of the front end 101a.

Figure 8:
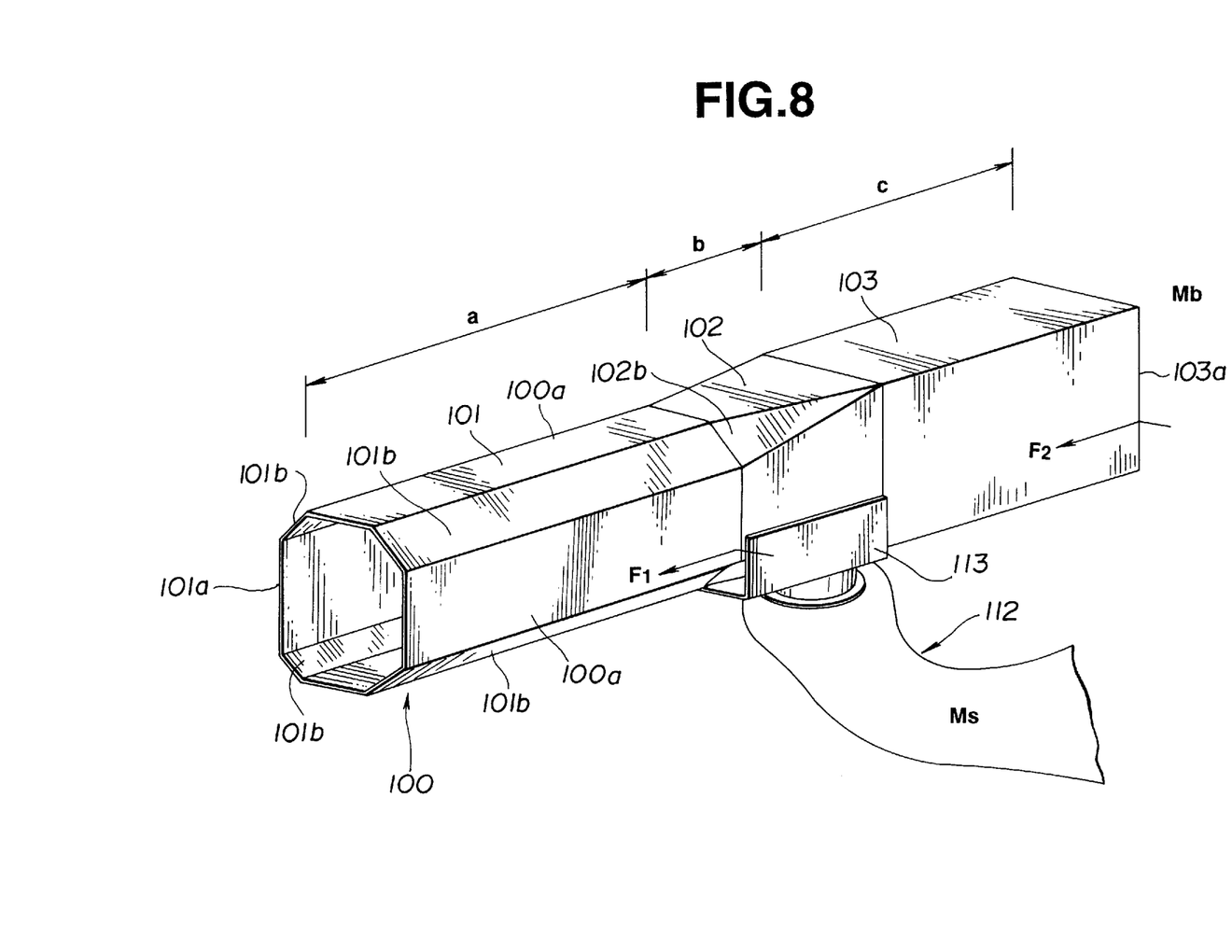
FIG. 8 is a perspective view of a third embodiment of the front side member according to the present invention.

Referring to FIG. 8, there is shown a third embodiment of the structural member of the vehicle body and, more particularly, a front side member according to the present invention.

The third embodiment is generally similar to the first embodiment except that a front suspension member 112 is connected to the intermediate portion 102 through a mount bracket 113, and that the thickness of the construction member of the front portion 101 is formed thinner than that of the rear portion 103. The mount bracket 113 is formed in a L-shape and fixedly connected to the low base wall 100a and side base wall 100a of the intermediate portion 102. The mount bracket 113 further functions to reinforce the intermediate portion 102. The front suspension member 112 is connected at a lower surface of the mount bracket 113.

In the event of the front-end collision of the vehicle equipped with the front side members 100 of the third embodiment, the inertia force $F_1+F_2$, which is the sum of the vehicle body weight Mb and the weight Ms of the front suspension member 112 and its attachments is applied to the front portion 101, and the inertial force $F_2$ of the vehicle body weight Mb is applied to the rear portion 103.

Herein, assuming that a half of the vehicle body weight Mb is 400 kg, a half of the weight Ms of the suspension member is 50 kg, and the decelerating acceleration $\alpha_e$ of the engine 110 and the deceleration acceleration $\alpha_b$ of the vehicle are both $\alpha(m/s^2)$, the applied force is determined to be $F_1=200\alpha(N)$, $F_2=600\alpha(N)$. Therefore, the inertia force applied to the front portion 101 becomes $50\alpha(N)+400\alpha(N)=450\alpha(N)$, and the inertia force applied to the rear portion 103 becomes $400\alpha(N)$. As a result, the ratio between the applied compressive forces to the front and rear portions 101 and 103 becomes $1.13:1\approx800:600=(F_1+F_2):F_2$.

Since the ratio between the compressive strengths of an octagonal cross-section hollow member and a rectangular cross-section hollow member with the same cross-sectional area and the same thickness is about 3:2 as mentioned above, it may happen that the front side member 100 is deformed from the rear portion 103 in case that the front and rear portions 101 and 103 are made from the same thickness member.

Therefore, by decreasing the thickness of the member of the front portion 101 so as to be thinner than that of the rear portion 103, the front and rear portions 101 and 103 are balanced in applied inertia force and compressive strength. This certainly deforms the front side member 100 from a side of the front end 101a in the event of the front-end collision, As is similar to the second embodiment of FIG. 7, if the easy compression parts 111 are formed in the vicinity of the front end 101a, the front portion 101 is smoothly compressingly deformed more and more in the event of the front-end collision.

Figure 9:
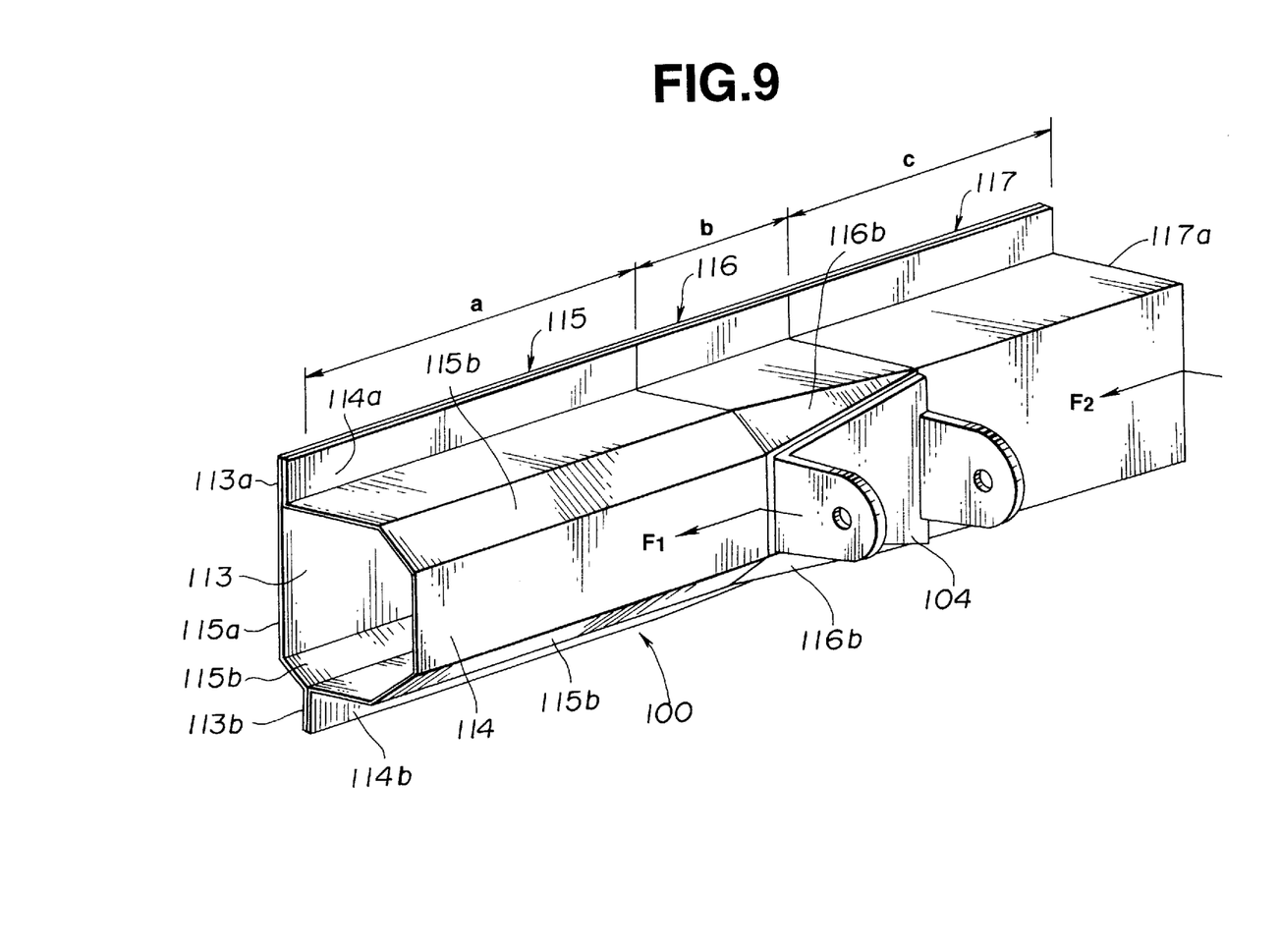
FIG. 9 is a perspective view of a fourth embodiment of the front side member according to the present invention.

Referring to FIG. 9, there is shown a fourth embodiment of the structural member of the vehicle body and, more particularly, a front side member according to the present invention.

The fourth embodiment is generally similar to the first embodiment except that the front side member 100 is formed from two panel members 113 and 114, and that a front portion 115 of the front side member 100 is formed in a heptagonal shape in cross-section by the panel members 113 and 114. The front side member is formed by connecting flanges 113a and 113b of the panel member 113 with flanges 114a and 114b of the panel member 114, respectively, by means of spot welding. The heptagonal cross-section of the front portion 115 is constituted by four base walls 115a and three oblique walls 115b formed at three corners of the four base walls 101a, as shown in FIG. 9. A rear portion 117 is rectangular in shape in cross-section. the rear portion 117 comprises a flat wall of the panel 113 and a channel-shaped section of panel 114 so that the compressive strength of the rear portion 117 is lower than that of the front portion 115.

As is clear from FIG. 9, the cross-sections of the front and rear portions 115 and 117 are constant in the axial direction. An intermediate portion 116 is formed so that its cross-section continuously changes from the heptagon of the front portion 115 to the rectangle of the rear portion 117. That is, three oblique walls 116b of the intermediate portion 116 are gradually reduced and at a connecting portion with the rear portion 117. The intermediate portion 116 mount bracket 104 which is the same as that of the first embodiment.

In a event of the front-end collision of the vehicle equipped with the front side members 100 of the fourth embodiment, the inertia force $F_1+F_2$ of the sum of the vehicle weight Mb and the engine weight Me is applied to the front portion 115, and the inertia force F2 of the vehicle weight Mb is applied to the rear portion 117.

Herein, assuming that a half of the weight Me of the engine 110 is 200 kg, a half of the weight Mb of the vehicle body except for the engine weight Me is 400 kg, and the decelerating acceleration $\alpha_e$ of the engine 110 and the deceleration acceleration $\alpha_b$ of the vehicle are both $\alpha(m/s^2)$, the applied force is determined to be $F_1=200\alpha(N)$, $F_2=400\alpha$ (N). Therefore, the inertia force applied to the front portion 115 becomes $200\alpha(N)+400\alpha(N)=600\alpha(N)$, and the inertial force applied to the rear portion 117 becomes $400\alpha(N)$. As a result, the ratio between the applied compressive forces to the front and rear portions 115 and 117 becomes 3:2= $600:400=(F_1+F_2):F_2$.

According to the experimental result, the ratio between the compressive strength of a heptagonal cross-section member and a rectangular cross-section member, which have the same cross-sectional area and the same thickness, is about 2.7:2. Therefore, the front portion 115 is easily deformed as compared with the rear portion 117. Therefore, the front side member 100 is compressingly deformed from the front portion 115.

Figure 10:
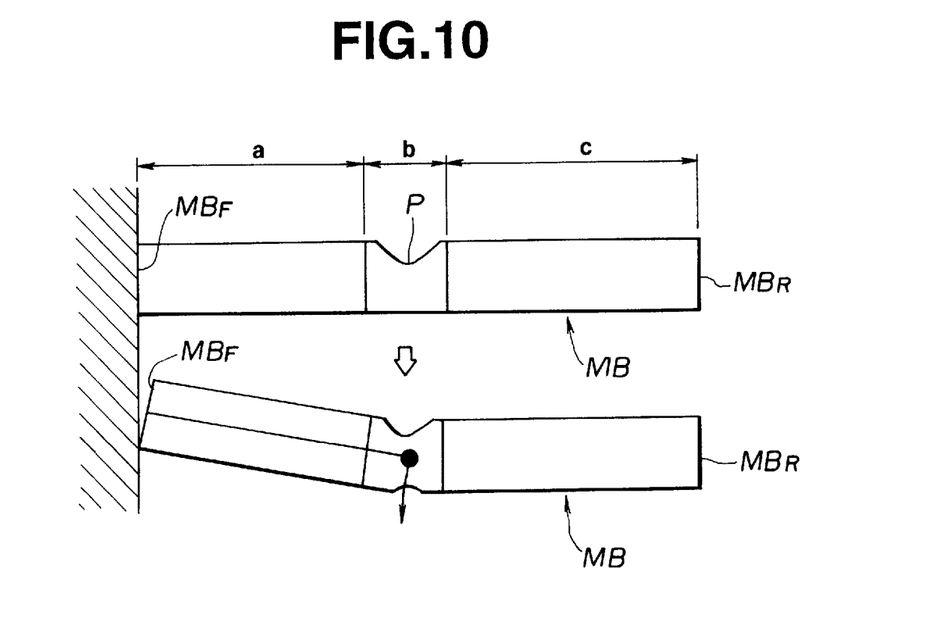
FIG. 10 is a diagrammatic view which shows a relationship between a starting point of a compressive deformation and bending of the structural member.

Considering the relationship between the starting point of the axial compressive deformation and the tendency of the bending deformation as to the structural member having a closed cross-section which is used in the vehicle front side member, when such front side member has a free front end $MB_F$ and a fixed rear end $MB_R$, as shown in FIG. 10, and when a starting point P of the compression is a generally center portion, such front side member is easily bent at the point P due to some axial shift (bending moment) on the collision force applied direction.

Figure 11:
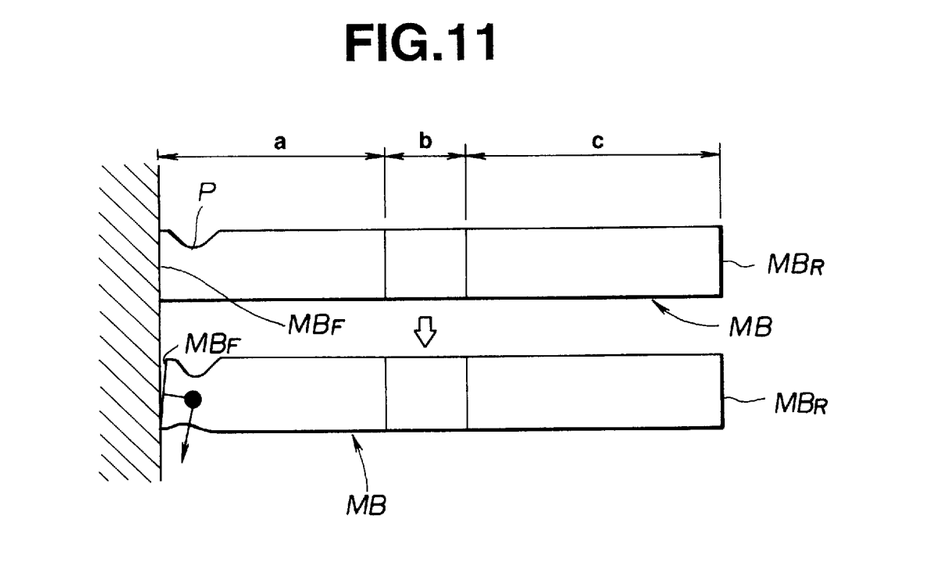
FIG. 11 is another diagrammatic view which shows a relationship between a starting point of a compressive deformation and a bending of the structural member.

On the other hand, as shown in FIG. 11, when the compression starting point P is located at a near portion of the front end $MB_F$, the operation of bending moment tends to be suppressed. Therefore, the front side member does not cause a bending deformation.

In this fourth embodiment, the front portion 115 and the intermediate portion 116 are heptagonal in cross-section by connecting the panels 113 and 114. Furthermore, the front side member 100 is not axially symmetric and is formed so that the strength of the outer side is higher than that of the inner side. Accordingly, this non-axially-symmetric front side member 100 is constituted so as to easily generate a bending deformation as compared with the axially symmetric front side member 100 according to the first embodiment.

However, the intermediate portion 116 is reinforced by the mount bracket 114 and therefore is prevented from generating a bending deformation.

It will be understood that in order to achieve further smooth deformation of the front portion 115, the easy compression parts 111 may be formed in the vicinity of the front end 115a, or the front portion 115 may be made by a member thinner than that of the rear portion 117.

Figure 12:
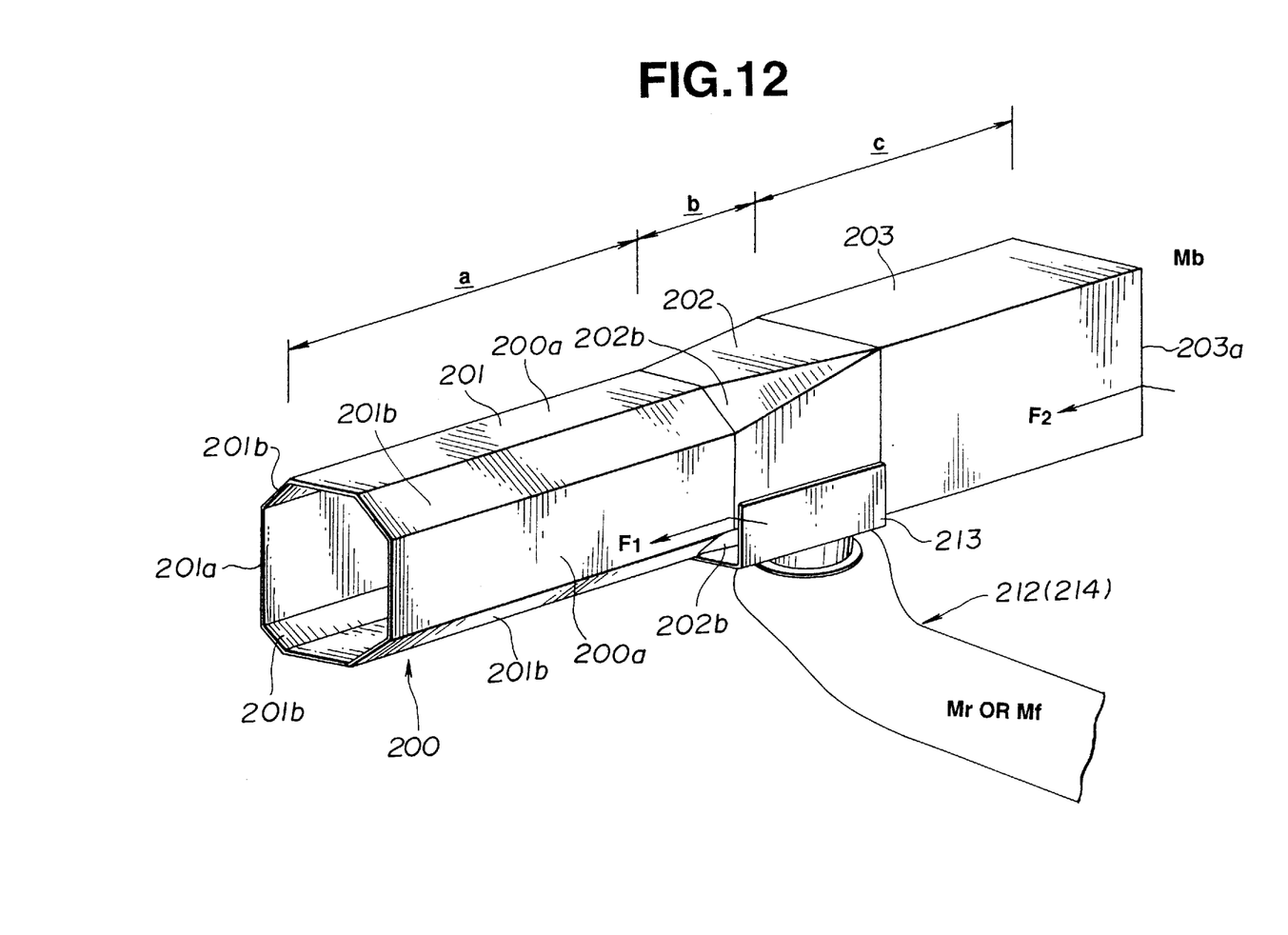
FIG. 12 is a perspective view of a rear side member in accordance with a fifth embodiment according to the present invention.

Referring to FIG. 12, there is shown a fifth embodiment of the structural member of the vehicle body and more particularly to a rear side member of the vehicle body according to the present invention. The rear side member 200 is arranged to absorb collision energy in the event of a rear-end collision of the vehicle. The rear side member 200 comprises a front portion 201 located at a rear end portion of the vehicle body and a rear portion 203 located at a front part of the rear side member 200. An intermediate portion 202 is disposed between the front and rear portions 201 and 203.

As is similar to the first embodiment shown in FIGS. 1 to 3, the rear side member 200 is made from a rectangular extruded member.

It will be understood that the rear side member 200 may be made from a rectangular extruded member which has a cross-section the same as that of the rear portion 203. The rectangular extruded member is cut to have a length of the rear side member 200, and then the front portion 201 and the intermediate portion 202 are press-formed to have respective cross-sections. The front portion 201 is octagonal in cross-section. The octagonal cross-section comprises four base walls 200a and four oblique walls 201b formed at four corners of the four base walls 200a. The rear portion 103 comprises four base walls 200a and is formed rectangular in cross-section. The intermediate portion 202 is formed so that its cross-section continuously changes from the octagon of the front portion 201 to the rectangle of the rear portion 203. That is, four oblique walls 202b of the intermediate portion 202 gradually reduced and disappear at a connecting portion between the intermediate portion 202 and the rear portion 203. In this embodiment, the thickness of the structural member of the front portion 201 is formed by a member whose thickness is thinner than that of the rear portion 203.

A mount bracket 213 of a L-shape is fixed to inner side wall and bottom base wall 202a and functions to improve the compressive strength of the intermediate portion 202. The mount bracket 213 is connected with an installation portion of a rear suspension member 212 or an installation portion of a fuel tank 214 so that the intermediate portion 202 supports the rear suspension member 213 or fuel tank 214.

With the thus arranged rear side member, in the event of rear-end collision of the vehicle, an inertia force of the vehicle body weight and the weight of the rear suspension are applied toward the front portion 201 of the rear side member 200 as a crush force.

In the event of the rear-end collision of the vehicle, the inertia force $F_1+F_2$ which is the sum of the vehicle weight Mb and the rear suspension weight Mr or the fuel tank weight Mf, is applied to the front portion 201, and the inertia force $F_2$ of the vehicle weight Mb is applied to the rear portion 203.

For example, assuming that a half of the weight Mb of the vehicle body is 400 kg, a half of the weight Mr of the rear suspension or a half of the weight Mf of the fuel tank is 60 kg, and the decelerating acceleration of the vehicle and the deceleration acceleration of the suspension or fuel tank are both $\alpha(m/s^2)$, the applied force is determined to be $F_1=60\alpha$ (N) and $F_2=400\alpha(N)$. Therefore, the inertia force applied to the front portion 201 becomes $60\alpha(N)+400\alpha(N)=460\alpha(N)$, and the inertial force applied to the rear portion 203 becomes $400\alpha(N)$. As a result, the ratio between the applied compressive forces to the front and rear portions 201 and 203 becomes $1.15:1\approx460:400=(F_1+F_2):F_2$. Since the ratio between the compressive strength of an octagonal cross-section member and a rectangular cross-section member with the same cross-sectional area and the same thickness is about 3:2 as mentioned above, it may happen that the front side member 100 is deformed from the rear portion 203 in cases where the front and rear portions 201 and 203 are made from the same thickness member.

Therefore, by decreasing the thickness of the member of the front portion 201 so as to be thinner than that of the rear portion 203, the compressive strengths of the front and rear portions 201 and 203 are balanced with the respective applied inertia forces, or set such that the compressive strength of the rear portion 203 becomes greater than that of the front portion 201. This enables a certain deformation of the rear side member 200 from a side of the front end 201a in the event of the rear-end collision.

More particularly, by effectively utilizing the fuel tank 214 as a weight supported to the intermediate portion 202, the compressive deformation of the rear side member 200 is stopped so as not to reach the installation portion of the fuel tank 214. Therefore, the fuel tank 214 is safely protected from some damages.

Figure 13:
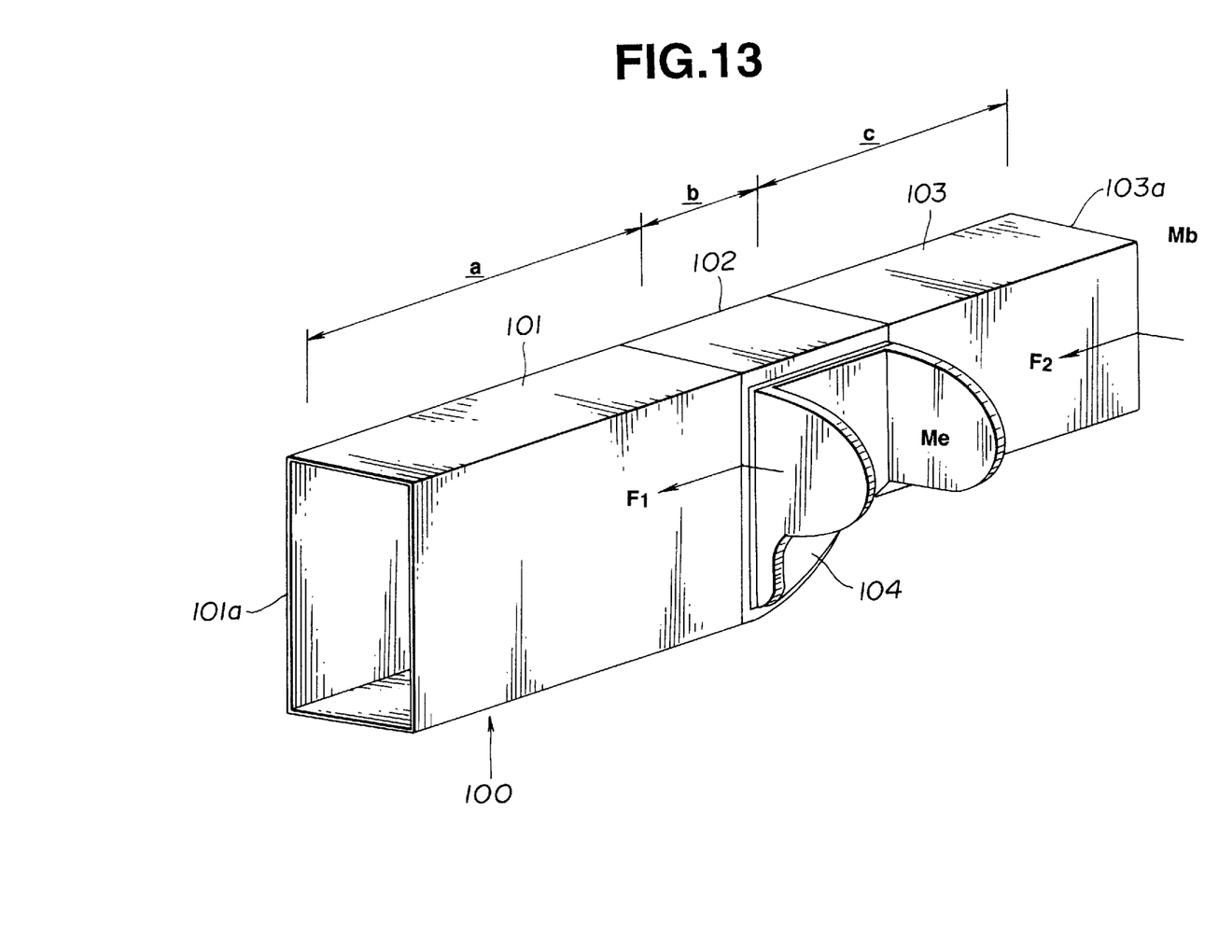
FIG. 13 is a perspective view of a sixth embodiment of the front side member according to the present invention.

Referring to FIG. 13, there is shown a sixth embodiment of the structural member of the vehicle body and, more particularly, the front side member 100 according to the present invention. The front side member 100 of the sixth embodiment is formed by a member which has a rectangular cross-section from the front end to the rear end.

The cross-sectional area of the front portion 101 is formed to be larger than that of the rear portion 103. The intermediate portion 102 is formed to gradually decrease the cross section while keeping a rectangular shape. A mount bracket 104 is fixedly connected with an inner base wall 100a of the intermediate portion 102 and functions to increase the compressive strength of the intermediate portion 102 so that the compressive strength of the intermediate portion becomes larger than those of the front and rear portions 101 and 103. The mount bracket 104 supports a predetermined weight such as the weight Me of the engine 110 so that the intermediate portion 102 supports the engine 110.

With the thus arranged structure, assuming that the weight of the engine 100 is Me, the weight of the vehicle body except for the engine weight Me is Mb, and the decelerating acceleration of the vehicle and the engine 110 is $\alpha(m/s^2)$, the inertia force corresponding to the engine weight Me becomes $F_1=Me\cdot\alpha$, and the inertia force corresponding to the vehicle body weight Mb becomes $F_2=Mb\cdot\alpha$. Therefore, in a event of the front-end collision of the vehicle, the front portion 101 is compressed by the force $(F_1+F_2)$, and the rear portion 103 is compressed by the force $F_2$.

Since the cross-sectional area of the front portion 101 is arranged to be (Me+Mb)/Mb times the rear portion 103, the ratio of the compressive strengths of the front and rear portions 101 and 103 becomes (Me+Mb)/Mb. As a result, the applied inertia force and the compressive strength of each of the front and rear portions 101 and 103 are balanced with each other. Therefore, the front side member 100 is smoothly deformed in turn from the front end 101a to a backward side in the event of the front-end collision.

Furthermore, it will be understood that the front portion 101 may have the easy compression parts 111 in the vicinity of the front end or may be formed by a thinner thickness member as compared with that of the rear portion 101 so that the front side member is further smoothly deformed from the front end.

With the thus arranged structural member, since the cross-section of the front portion has a compressive strength which is higher than that of the rear portion, a bending rigidity and torsional rigidity of the structural member is improved. Furthermore, it becomes possible to execute a collision energy absorption by sufficiently deforming the structural member from a front end to a rear end in the event of a front-end collision of the vehicle.

Since this structural member does not require the addition of a dedicated reinforcement to the rear portion or an increase the cross sectional area of the rear portion, production cost and weight thereof are improved. Furthermore, the simple structure of the rear portion enables an easy connection with the other portion and therefore assembles and production cost thereof are improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A structural member for a vehicle body, said structural member formed to extend in a longitudinal direction of a vehicle and to receive a compressive force in the longitudinal direction in the event of a vehicle collision, said structural member comprising:

a front portion having a front, collision end, a rear end, and a first polygonal cross-section;

a rear portion having a front end, a rear end, and a second polygonal cross-section different from the first polygonal cross-section, and, upon receipt of a longitudinal compressive force, said rear portion having a smaller compressive strength than said front portion due to the shape of the second polygonal cross-section relative to the shape of the first polygonal cross-section; and an intermediate portion connecting said front portion and said rear portion and supporting a portion of the vehicle weight, said intermediate portion having a cross-section that changes in the longitudinal direction of the vehicle from said front portion to said rear portion, and, said intermediate portion being formed of a material having at least one of hardness and thickness greater than a material of said front portion and a material of said rear portion, wherein, upon receipt of the longitudinal compressive force, said intermediate portion has a compressive strength greater than the compressive strengths of each of said front portion and said rear portion.

2. A structural member as claimed in claim 1, further comprising deformable parts formed adjacent said front, collision end of said front portion.

3. A structural member as claimed in claim 1, wherein said intermediate portion includes a support member to support an engine of the vehicle.

4. A structural member as claimed in claim 1, wherein said intermediate portion includes a support member to support a front suspension member of the vehicle.

5. A structural member as claimed in claim 1, wherein said intermediate portion includes a support member to support a rear suspension member of the vehicle.

6. A structural member as claimed in claim 1, wherein said intermediate portion includes a support member to support a fuel tank of the vehicle.

7. A front side member for a vehicle body comprising:

a front portion having a front, collision end for receiving a collision impact applied thereto in the event of a front-end vehicle collision, said front portion having a first polygonal cross-section;

an intermediate portion integrally connected to said front portion, said intermediate portion having a support member for supporting a part of a vehicle weight such that, in the event of a front-end collision, an inertia force corresponding to the part of the vehicle weight is applied to said front portion and said intermediate portion; and a rear portion integrally connected to said intermediate portion, said rear portion supporting another part of the vehicle weight such that, in the event of a front-end collision, an inertia force corresponding to the other part of the vehicle weight is applied to said front portion, said intermediate portion, and said rear portion, said rear portion having a second polygonal cross-section, said second polygonal cross-section having a number of sides less than said first polygonal cross-section, said rear portion having a smaller compressive strength than said front portion due to the shape of the second polygonal cross-section relative to the shape of the first polygonal cross-section.

8. A structural member as claimed in claim 1, wherein:

said rear end of said rear portion operably connects to a vehicle component having a first weight, said intermediate portion has a first end integrally connected to said rear end of said front portion and a second end integrally connected to said front end of said rear portion, said intermediate portion supporting an engine unit having a second weight, and wherein, in the event of a front-end collision, said front portion receives an inertia force due to said first weight and an inertia force due to said second weight, and said rear portion receives an inertia force due to said first weight.

9. A structural member for a vehicle body, said structural member formed to extend in a longitudinal direction of a vehicle and to receive a compressive force in the longitudinal direction in the event of a vehicle collision, said structural member comprising:

a front portion having a front, collision end, a rear end, and a first constant cross-sectional area;

a rear portion having a front end, a rear end, and a second constant cross-sectional area smaller than the first constant cross-sectional area so that, upon receipt of a longitudinal compressive force, said rear portion has a smaller compressive strength than said front portion; and an intermediate portion connecting said front portion and said rear portion and supporting a portion of the vehicle weight, said intermediate portion having a cross-sectional area that changes from said front portion to said rear portion, and, said intermediate portion being formed of a material having at least one of hardness and thickness greater than a material of said front portion and a material of said rear portion, wherein, upon receipt of the longitudinal compressive force, said intermediate portion has a compressive strength greater than the compressive strengths of each of said front portion and said rear portion.

10. A structural member for a vehicle body, said structural member formed to extend in a longitudinal direction of a vehicle and to receive a compressive force in the longitudinal direction in the event of a vehicle collision, said structural member comprising:

a front portion having a front, collision end, a rear end, and a first constant cross-sectional area;

a rear portion having a front end, a rear end, and a second constant cross-sectional area smaller than the first constant cross-sectional area so that, upon receipt of a longitudinal compressive force, said rear portion has a smaller compressive strength than said front portion; and an intermediate portion connecting said front portion and said rear portion and supporting a portion of the vehicle weight, said intermediate portion having a cross-section that continuously changes in the longitudinal direction of the vehicle from said front portion to said rear portion, and, said intermediate member having a reinforcing member for increasing a compressive strength of said intermediate portion so that, upon receipt of the longitudinal compressive force, said intermediate portion has a compressive strength greater than the compressive strengths of each of said front portion and said rear portion.

11. A structural member as claimed in claim 1, wherein the second polygonal cross-section has fewer sides than the first polygonal cross-section.

12. A structural member as claimed in claim 11, wherein the first polygonal cross-section is an octagon, and the second polygonal cross-section is a rectangle.

13. A structural member as claimed in claim 11, wherein the first polygonal cross-section is a heptagon, and the second polygonal cross-section is a rectangle.

14. A structural member for a vehicle body, said structural member formed to extend in a longitudinal direction of a vehicle and to receive a compressive force in the longitudinal direction in the event of a vehicle collision, said structural member comprising:

a front portion having a front, collision end, a second end, and a first polygonal cross-section;

a rear portion having a front end, a rear end, and a second polygonal cross-section different from the first polygonal cross-section of said front portion, and, upon receipt of a longitudinal compressive force, said rear portion having a smaller compressive strength than said front portion due to the shape of the second polygonal cross-section relative to the shape of the first polygonal cross-section;

an intermediate portion connecting said front portion and said rear portion and supporting a portion of the vehicle weight, said intermediate portion having a cross-section that changes in the longitudinal direction of the vehicle from said front portion to said rear portion; and a reinforcing member for reinforcing said intermediate portion and, upon receipt of a longitudinal force, for increasing a compressive strength of said intermediate portion relative to the compressive strengths of each of said front portion and said rear portion.

15. A structural member as claimed in claim 14, wherein said reinforcing member is a mount bracket.

16. A structural member as claimed in claim 7, wherein the first polygonal cross-section is an octagon, and the second polygonal cross-section is a rectangle.

17. A structural member as claimed in claim 7, wherein the first polygonal cross-section is a heptagon, and the second polygonal cross-section is a rectangle.

18. A structural member as claimed in claim 9, wherein the first constant cross-sectional area and the second constant cross-sectional area are in the shape of a rectangle.

19. A structural member as claimed in claim 10, wherein the first constant cross-sectional area and the second constant cross-sectional area are in the shape of a rectangle.

20. A structural member as claimed in claim 10, wherein said reinforcing member is a mount bracket.

21. A structural member for a vehicle body, said structural member formed to extend in a longitudinal direction of a vehicle and to receive a compressive force in the longitudinal direction in the event of a vehicle collision, said structural member comprising:

a front portion having a front, collision end, a second end, and a first polygonal cross-section;

a rear portion having a front end, a rear end, and a second polygonal cross-section different from the first polygonal cross-section of said front portion, and, upon receipt of a longitudinal compressive force, said rear portion having a smaller compressive strength than said front portion due to the shape of the second polygonal cross-section relative to the shape of the first polygonal cross-section; and an intermediate portion connecting said front portion and said rear portion and supporting a portion of the vehicle weight, said intermediate portion having a cross-section that changes in the longitudinal direction of the vehicle from said front portion to said rear portion.

22. A structural member for a vehicle body, said structural member formed to extend in a longitudinal direction of a vehicle and to receive a compressive force in the longitudinal direction in the event of a vehicle collision, said structural member comprising:

a front portion having a front, collision end, a rear end, and a first constant cross-sectional area;

a rear portion having a front end, a rear end, and a second constant cross-sectional area different from the first constant cross-sectional area, and, upon receipt of a longitudinal compressive force, said rear portion having a smaller compressive strength than said front portion due to the size of the second constant cross-sectional area relative to the size of the first constant cross-sectional area; and an intermediate portion connecting said front portion and said rear portion and supporting a portion of the vehicle weight, said intermediate portion having a cross-sectional area that changes from said front portion to said rear portion.

* * * * *